Figure 1:
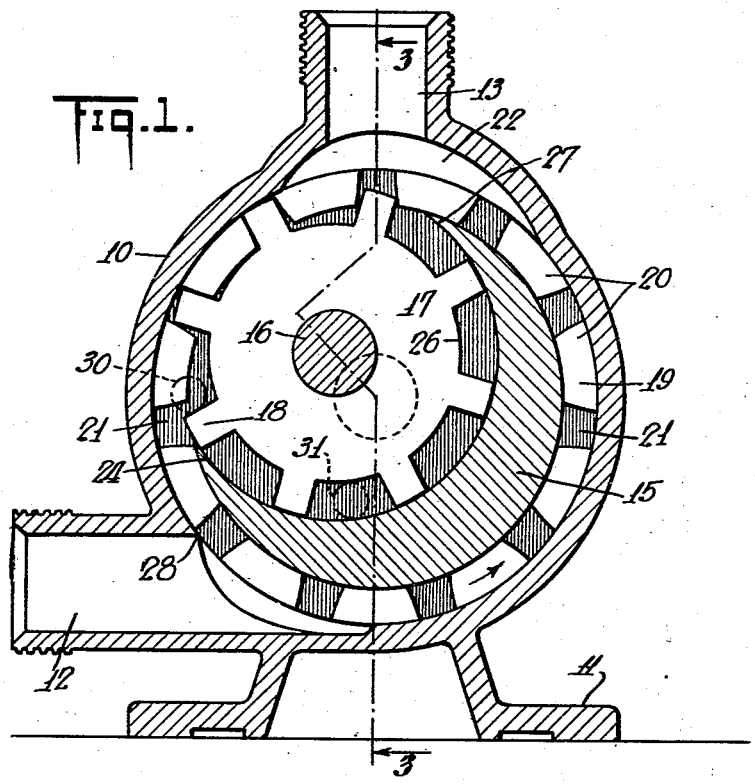

March 21, 1933.　　　C. W. VOGT　　　1,902,315

ROTARY PUMP

Filed May 15, 1930　　　2 Sheets-Sheet 1

INVENTOR
Clarence W. Vogt
BY
ATTORNEYS

March 21, 1933.   C. W. VOGT   1,902,315
ROTARY PUMP
Filed May 15, 1930   2 Sheets-Sheet 2
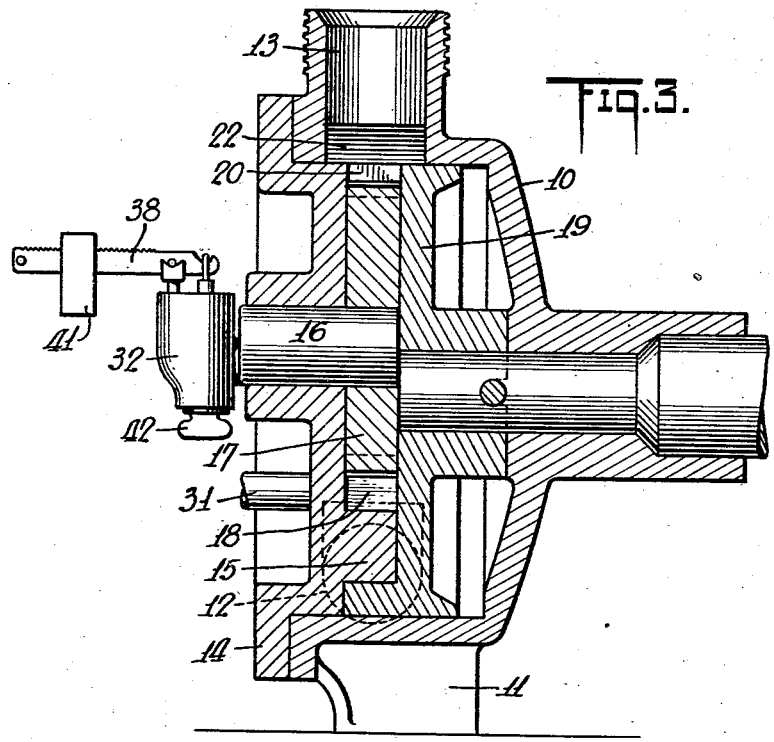
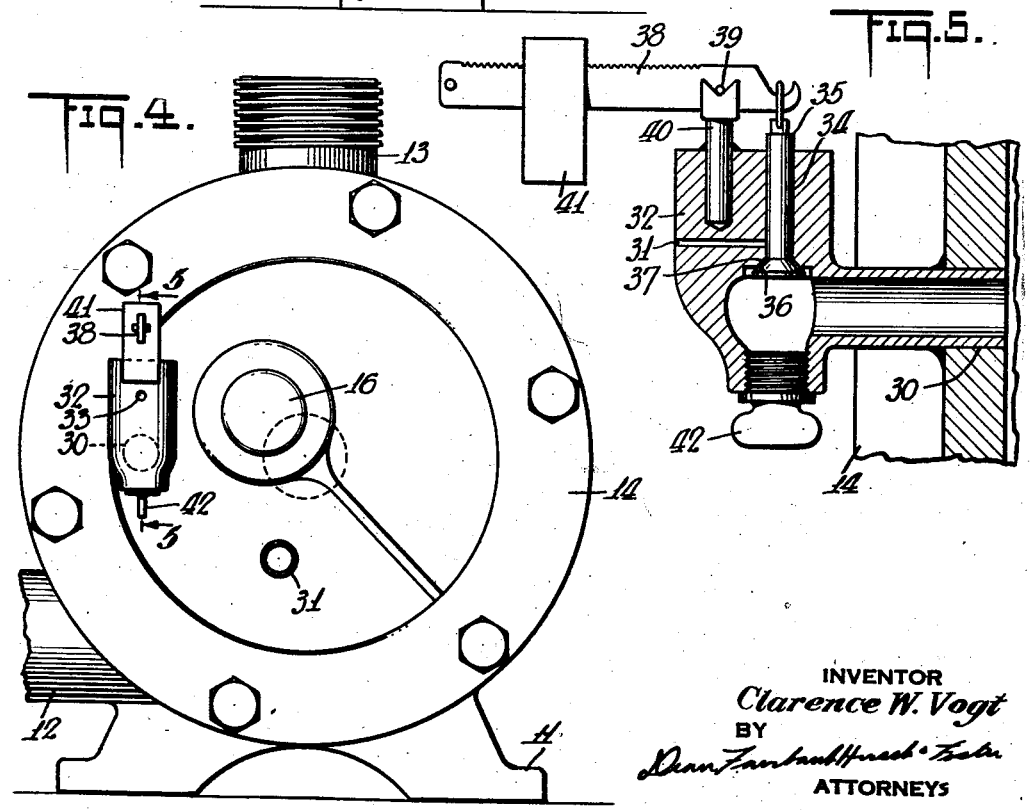
INVENTOR
Clarence W. Vogt
BY
ATTORNEYS Patented Mar. 21, 1933

1,902,315

UNITED STATES PATENT OFFICE

CLARENCE W. VOGT, OF LOUISVILLE, KENTUCKY, ASSIGNOR TO VOGT INSTANT FREEZERS INCORPORATED, OF LOUISVILLE, KENTUCKY, A CORPORATION OF DELAWARE

ROTARY PUMP

Application filed May 15, 1930. Serial No. 452,624.

In the freezing of ice cream or other comestibles in a continuous freezer, it is necessary to provide some form of pumping mechanism to force the mix through the freezer at the desired rate. For this purpose some form of gear pump is satisfactory if the mix is homogeneous, but these comestibles sometimes contain such solid ingredients as nuts, fruit chunks and the like. These are liable to become lodged between the teeth of the gears forming the pump and cause a very undesirable binding action between the rotating elements and an undesirable crushing of the solids.

One object of the present invention is to provide an improvement in a rotary gear type of pump whereby the lodgment of the solid ingredients of a liquid or plastic material between the rotary elements of the pump and the crushing of the solids is substantially prevented.

It is also important in the manufacture of ice cream and certain other comestibles to force in air or other fluid with the mix being pumped in order to give the desired overrun to the frozen product, and to vary the ratio of the fluid and the mix in order to effect selective overrun in the ice cream.

A further object of the present invention is to provide a rotary pump in which air or other fluid and the mix may be separately pumped by the same gear elements and delivered together and the relative proportions selectively controlling.

A further object is to provide a gear pump in which two fluids, either liquid or gaseous, may be pumped at the same time and in the desired proportions by a single pair of gear elements.

The present invention relates particularly to that type of rotary gear pump having a pair of intermeshing toothed rotors, one encircling and eccentric to the other. These operatively intermesh at one side of the chamber and the space between the respective disengaged teeth being occupied by a stationary crescentic partition. Either rotor may be driven and the other serve as an idler. I have shown the inner rotor as the idler. In this type of pump, the idler pinion teeth move successively into the interdental cavities of the rotor and function in a piston-like manner to extrude the material therefrom into a discharge conduit. In the usual construction, the ends of these pinion teeth are so much narrower than the bases of the interdental cavities of the rotor that as these spaces move beyond the end of the crescentic partition some of the material disposed in said cavities may gravitate or otherwise pass into the interdental spaces of the pinion before the respective teeth of the rotating elements are in full intermeshed relationship. If the material being pumped contains solid ingredients, these ingredients will become lodged in the interdental troughs between pinion teeth and bind between the rotor and said pinion. Also the suction port is usually so positioned in respect to the crescentic partition that the material as soon as it comes into the field of action of the rotors fills the interdental cavities of both rotors. The solid ingredients of the material in these troughs or cavities of the idler will then bind between the rotor and the idler when the idler teeth adjoining these troughs move into full intermeshed relationship with said rotor.

As one important feature of the present invention the suction intake of the pump is disposed opposite the outer surface of the crescentic member or partition so that the material may enter the interdental spaces of the outer rotor only after they are completely isolated from the interdental spaces of the inner rotor or idler and the material cannot enter the last mentioned spaces. Thus by means of this improved organization the material will all be introduced into the cavities of the rotor and advanced toward the discharge conduit where it is extruded by the piston-like operation of the idler teeth.

As a further important feature of my invention, the width of each tooth of the idler at its crest or outer end is made nearly as wide as the width of the inner end of interdental cavities of the rotor as is compatible with the capacity requirement of the pump and its efficient operation. This is effected by making the teeth of the idler substantially rectangular and shallow with the sides thereof substantially parallel and by constructing the rotor with cavities conforming as near as possible to the size and shape of the idler teeth. Thus, the substantially flat end of each tooth of the idler is but slightly narrower than the inner end of a corresponding space of the rotor. Therefore as the tooth and space move beyond the point of the crescent from opposite sides at the same time, the space is covered by the tooth end as fast as said space is uncovered by the crescent. There is the minimum opportunity for solids to fall or move into the interdental spaces of the idler. The action of centrifugal force also aids in preventing any movement of any solid and at the same time the air in the interdental spaces of the pinion is being compressed and forced outwardly to aid the ejection of solids.

In order to simultaneously force two separate fluids such as air or other fluid and the material to be aerated, I provide as a further important feature of my invention a second suction inlet for the fluid to be pumped by the idler or inner rotor. A pair of such inlets may be provided. One is disposed beyond one end of the crescentic member so that it may fill the interdental spaces of both rotors as the teeth of the idler are moving out of the cavities of the outer rotor. The other is disposed on one side of said crescentic member so that it will fill only the troughs or interdental spaces of the idler. Either one of these inlets may be used in accordance with the amount of fluid which it is desired to intermix with the other material, or both may be used, one for air or other fluid and the other for another liquid.

As a further feature of my invention, suitable control means are used at each of these inlets for automatically regulating the amount of fluid introduced so as to give the desired overrun.

The invention also involves certain other new and important features of construction and combinations of parts all of which will be hereinafter set forth and claimed.

Although the novel features which are believed to be characteristic of this invention are particularly useful in a pump employed for forcing air or other fluid and the liquid into a continuous freezer, it will be apparent that the pump may be used in various different industries and its proportions and details may be varied in accordance with the character of the material to be pumped. I have illustrated in the accompanying drawings only one form which the invention may assume. In these drawings Fig. 1 is a transverse section taken through the center of the pump.

Figure 2:
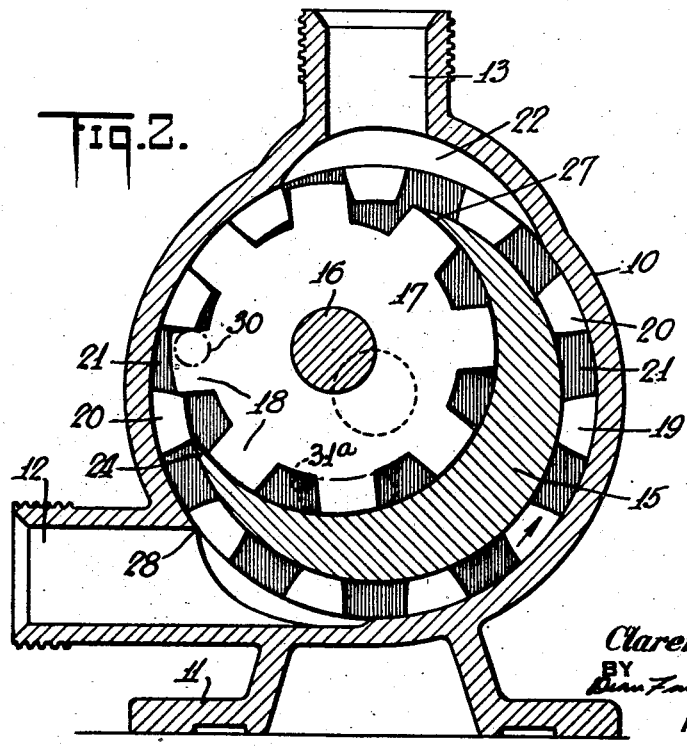

Fig. 2 is a transverse section taken through the center of the pump, showing the pump gears in a slightly different position to that shown in Fig. 1, Fig. 3 is a longitudinal section taken on the line 3—3 of Fig. 1, Fig. 4 is a front elevation of the pump, and Fig. 5 is a sectional detail taken on the line 5—5 of Fig. 4.

Like reference characters denote like parts in the several figures of the drawings.

In the following description and in the claims parts will be identified by specific names for convenience, but they are intended to be as generic in their application to similar parts as the art will permit.

In the specific form illustrated, there is provided a cylindrical pump casing 10 supported on a base 11 and having associated therewith a suction intake conduit 12, and a discharge conduit 13. The casing 10 is closed at one end by a head plate 14 which has projecting from the inside surface thereof a crescentic member or partition 15. Press fitted or otherwise secured to said head plate 14 is a stub pin 16 on which is rotatably mounted an idler 17 having a plurality of circumferentially spaced gear teeth 18, the crest curvatures of which conform with the inner curved surface of the crescentic member 15. Also mounted in the casing 10 is a rotor 19 having an annular series of teeth 20 interspaced to form segmental cavities 21. This rotates in proximate contact with the interior periphery of the cylindrical casing 10 and the outside curved surface of the member 15. The teeth 20 fully intermesh with the idler teeth 18 at a point diametrically opposite to the point of maximum thickness of the crescent. The outlet 13 communicates with a chamber 22 which extends from the point of full intermeshing position to a point beyond the end of the crescentic member 15.

The rotor teeth 20 have the sides thereof slightly converging toward the inside to facilitate their engagement with the idler teeth 18 which are preferably constructed so that the sides thereof are substantially parallel in order to obviate binding action between the rotor and idler teeth. These idler teeth 18 are also made as shallow as is compatible with the capacity requirements of the pump and the rotor teeth 20 are correspondingly shallowed to conform with these idler teeth. Through the instrumentality of this construction, the crest widths of the teeth 18 are rendered substantially equal to the base widths of the interdental cavities of the rotor.

The inlet 12 is preferably tangential to the casing and is positioned opposite the outer surface of the crescentic member 15 at a distance from the end 24 of the latter greater than the width of the interdental space 21, so that the material as it enters said inlet can only fill the cavities 21, the member 15 acting as a baffle against the passage of material into the interdental troughs 26 of the idler 17. The end 24 of the member 15 extends beyond the corner 28 of the suction or intake chamber an amount equal at least to the base width of the rotor cavities 21. This improved arrangement obviates the possibility of any of the material which enters the suction conduit 12 from entering the spaces between the teeth of the idler, and subsequently effecting a binding action between the rotating elements of the pump unit.

The construction of the rotary elements of the pump permits the end 27 of the crescentic member 15 to extend along the chamber 22 immediately surrounding the discharge outlet 13 and close to the full intermeshing portion of the rotors. These elements begin to intermesh the instant that the teeth thereof leave this end 27. In this manner the material which passes into the cavities 21 of the rotor near the suction conduit 12 is advanced circumferentially by the rotor 19, and is prevented from entering the idler troughs 26 by the partition member 15. When these troughs arrive at a position within the chamber 22 adjoining the discharge conduit 13, the idler teeth 18 will immediately intermesh with the rotor teeth 20. The crest width of these teeth 18 being almost as wide as the base of the rotor cavities 21. These teeth as they leave the end 27 of the crescentic member 15 serve to support the material and prevent the escape of the solid ingredients of the material between said teeth and the side of said cavities 21.

If it is desired to introduce a fluid into the material as it is being pumped, there are provided one or more fluid inlet ports. I have shown two such inlet ports 30 and 31 which may form a suitable fluid supply or be exposed to the atmosphere if air is the fluid required. The port 30 is disposed in such a position that it will fill both the interdental idler troughs 26 and the rotor cavities 21 and the port 31 disposed in such a position that it will fill only the cavities 21. Means may be provided whereby either one of these ports may be used, in accordance with the amount of fluid desired to be mixed with the material being pumped. Each of these ports 30 and 31 may be provided with control means for selectively regulating the amount of fluid introduced into the field of action of the pump. These control means may be operated in response to the vacuum created in these interdental troughs and cavities as the adjoining teeth of the rotating elements depart from intermeshing relationship and may take the form of a valve casing 32 having an air or other fluid inlet opening 33 and having a bore 34 for the reception therein of a valve stem 35. The lower portion of this valve stem 35 is provided with a conical surface 36 which is adapted to engage in a valve seat 37 provided in the casing 32. This valve stem 35 is suspended from one end of a lever 38 having a fulcrum pin 39 supported by a member 40 secured to the casing 32. Slidably mounted along said lever 38 is a weight 41 which can be shifted along said lever in accordance with the selective amount of fluid desired to be introduced into the field of action of the pump. The casing is provided with a plug 42 which serves to permit access to the interior of the valve casing 32.

It should be noted that this type of fluid control is operated in response to the suction pressure in the interdental troughs 26 and cavities 21. As the idler teeth 18 rotate out of engaging relationship with the rotor 19 a vacuum is created in these troughs 26 and cavities 21. This vacuum will cause the valve stem 35 to be depressed against the action of the weight 41 and allow the induction of air through the opening 33 and into the pump. The amount this valve 36 will open will depend on the vacuum created.

It should be noted that the air or other fluid entrapped in the idler troughs 26 is compressed as the idler teeth 18 are advanced into intermeshing relationship with the rotor teeth 20. This compressed air serves to counteract any tendency of the solid ingredients of material in the cavities 21 from gravitating or otherwise escaping into the troughs 26 through the passageways formed between the sides of said cavities and the idler teeth 18.

In practice the rotor will ordinarily be turned at such a speed that as soon as the material can escape from the cavities of the rotor into the chamber 22 it will do so by the action of centrifugal force.

I have illustrated the suction control valve as connected to only the inlet 30. It will be obvious that if air is to be admitted through the port 31 this suction control valve may be attached to this inlet and the port 31 may be closed by a plug or in any other suitable manner.

When the control valve is used on the port 30 the port 31 may be closed. If desired, suction control valves may be employed on both of the ports. In many cases it is desirable to mix two separate and independent fluids, either of which may be a gas and the other a liquid, and to supply either or both under pressure. In such a case one fluid would enter the inlet port 31 and the other the inlet port 12. If two liquids and a gas are to be employed the two liquids may be in the ports 12 and 31 and the gas may enter the port 30. If the gas be under a pressure less than that of the atmosphere there will be subatmospheric pressure in the interdental spaces of both rotors so that separate fluids may enter the ports 30 and 31 to partially fill each series of interdental spaces, the remaining portion being filled by the gas admitted through the port 30.

Various combinations are possible for different gases, liquids or other materials to be mixed and delivered through the common outlet and by a single pair of rotors.

In the form shown in Fig. 1 the teeth of the pinion are comparatively narrow and the teeth of the gear or outer rotor are comparatively wide. Thus the volume of fluid admitted through the port 30 will necessarily be greater than that admitted through the port 12, assuming that both fluids are delivered under the same pressure. It will, of course, be obvious that this relative proportioning of the teeth may be varied to vary the relative proportions of the two ingredients. For instance, in Fig. 2, I have shown the teeth of the pinion very much wider than in Fig. 1 and the teeth of the outer gear or rotor corresponding narrower. If the teeth of the pinion be wide as in Fig. 2 the port 31a is preferably elongated to a length wider than one of the teeth so that it will always be in communication with at least one of the interdental spaces of the pinion.

It will, of course, be obvious that the dimensions of the rotor and crescentic partition may be of any desired length to give the pump the desired capacity for a given speed.

So far as concerns the use of separate inlet ports in the specified relationship to the crescentic member to cause the separate pumping of two materials, it will be obvious that the teeth need not be sh ow as illustrated, but may be of any desired shape or proportion heretofore employed in this art.

Where the preventing of solid material from entering the interdental spaces of the material is important, the teeth are preferably shallow and the crescentic member extends around the pinion for more than 180°.

Having thus described my invention, which I claim is new and desire to secure by Letters Patent is:

1. A rotary pump including a cylindrical casing, an inlet and discharge port associated with said casing, an internally toothed rotor adapted to rotate in close proximity to the interior periphery of said casing, a pinion eccentrically mounted with respect to said rotor and fully intermeshing therewith at one side of the cylindrical casing, and a stationary crescentic member disposed on the opposite side and occupying the space between the disengaged teeth of said rotor and wheel, the end of said member proximate the inlet port extending beyond the latter to such a distance during pumping operations as to serve as a baffle and prevent the induction of material from said port into the interdental spaces of the pinion.

2. A rotary pump including a cylindrical casing, inlet and discharge conduits associated with said casing, an internally toothed rotor mounted to rotate in close proximity to the interior periphery of said casing, a pinion eccentrically mounted with respect to said rotor and fully intermeshing therewith at one side of the cylindrical casing, and a stationary crescentic member disposed on the opposite side and occupying the space between the disengaged teeth of said rotor and wheel, the end of said member proximate the inlet conduit extending beyond the chamber surrounding said inlet conduit by an amount equal at least to the base widths of the interdental spaces of the rotor.

3. A gear pump of the type in which the intermeshing gear members are eccentrically mounted, one encircling the other with a crescentic partition therebetween diametrically opposite the point of full intermeshing, said pump having an outlet adjacent the meshing position of the gears and a suction inlet to the interdental spaces of the outer gear member and communicating with said spaces only when they are opposite the outer surface of said partition, the portion of said partition opposite to said inlet being imperforate, whereby the material being pumped does not enter the interdental spaces of the inner gear member.

4. A gear pump of the type in which the intermeshing gear members are eccentrically mounted, one encircling the other with a crescentic partition therebetween diametrically opposite the point of full intermeshing, said pump having an outlet proximate the meshing position of the gears and a suction inlet to the interdental spaces of the inner gear member and communicating with said spaces only when said spaces are opposite the inner surface of said partition, the portion of said partition opposite to said inlet being imperforate, whereby the material being pumped does not enter the interdental spaces of the outer gear member.

5. A gear pump of the type in which the intermeshing gear members are eccentrically mounted, one encircling the other with a crescentic partition therebetween diametrically opposite the point of full intermeshing, said pump having an outlet opposite the meshing position of the gears, a suction inlet to the interdental spaces of the outer gear member and communicating with said spaces only when they are opposite the outer surface of said partition, and a separate suction inlet to the interdental spaces of the inner gear member and communicating with said last mentioned spaces only when they are opposite the inner surface of said partition whereby two separate materials may be pumped and commingled at the outlet.

6. A gear pump of the type in which the intermeshing gear members are eccentrically mounted, one encircling the other with a crescentic partition therebetween diametrically opposite the point of full intermeshing, said pump having an outlet opposite the meshing position of the gears, a suction inlet to the interdental spaces of the outer gear member and communicating with said spaces only when they are opposite the outer surface of said partition, the portion of said partition opposite to said inlet being imperforate, and a separate suction inlet to the interdental spaces of both gear members at a point beyond the end of said crescentic member where the teeth are moving out of mesh.

7. A gear pump of the type in which the intermeshing gear members are eccentrically mounted, one encircling the other with a crescentic partition therebetween diametrically opposite the point of full intermeshing, said pump having an outlet opposite the meshing position of the gears, a suction inlet to the interdental spaces of the outer gear member and communicating with said spaces only when they are opposite the outer surface of said partition, the portion of said partition opposite to said inlet being imperforate, a separate suction inlet to the interdental spaces of the inner gear member and communicating with said last mentioned spaces only when they are opposite the inner surface of said partition, whereby two separate materials may be pumped and commingled at the outlet, and a third inlet disposed beyond the end of the crescentic member where the teeth are moving out of mesh.

8. A gear pump of the type in which the intermeshing gear members are eccentrically mounted, one encircling the other with a crescentic partition therebetween diametrically opposite the point of full intermeshing, said pump having an outlet opposite the meshing position of the gears, a gas suction inlet to the interdental spaces of the inner gear member and communicating with said spaces only when they are opposite the inner surface of said partition, and a main separate suction inlet for a non-compressible fluid to the interdental spaces of both gear members at a point beyond the end of said crescentic member where the teeth are moving out of mesh.

9. A gear pump of the type in which the intermeshing gear members are eccentrically mounted, one encircling the other with a crescentic partition therebetween diametrically opposite the point of full intermeshing, the interdental spaces of one gear member being wider than the interdental spaces of the other gear member, said pump having an outlet opposite the meshing position of the gears, a suction inlet to the interdental spaces of the outer gear member and communicating with said spaces only when they are opposite the outer surface of said partition, and a separate suction inlet to the interdental spaces of the inner gear member and communicating with said last mentioned spaces only when they are opposite the inner surface of said partition whereby two separate materials may be pumped and commingled at the outlet.

10. A rotary pump including a casing, an internally toothed rotor, an eccentrically mounted pinion disposed in full intermeshing relationship with said rotor at one point, a stationary crescentic member disposed opposite to said point and occupying the space between the disengaged teeth of the rotor and pinion, means for introducing a gas in the interdental spaces of the pinion at a point where said spaces are completely disengaged from the teeth of the rotor, and said casing having a main inlet for a non-compressible fluid to the interdental spaces of the rotor only after they are completely disengaged from the teeth of the pinion, and an outlet at the point of reengagement of the teeth of the pinion and rotor whereby during said reengagement the gas in the interdental spaces of the pinion aids in ejecting the noncompressible fluid from the interdental spaces of the rotor.

Signed at New York, in the county of New York and State of New York this 13th day of May A. D. 1930.

CLARENCE W. VOGT.